(12) United States Patent
Blagg et al.

(10) Patent No.: US 8,249,907 B2
(45) Date of Patent: Aug. 21, 2012

(54) SYSTEM AND METHOD FOR THE AUTOMATED DISPATCH OF FUELING OPERATIONS

(75) Inventors: Derek Blagg, Lawrenceville, GA (US); Timothy Lee Archer, Suwanee, GA (US); Warren Sutcliffe, Duluth, GA (US); John Eric Simmons, Covington, GA (US)

(73) Assignee: Varec, Inc., Norcross, GA (US)

( * ) Notice: Subject to any disclaimer, the term of this patent is extended or adjusted under 35 U.S.C. 154(b) by 0 days.

(21) Appl. No.: 13/238,140

(22) Filed: Sep. 21, 2011

(65) Prior Publication Data
US 2012/0010918 A1    Jan. 12, 2012

Related U.S. Application Data

(62) Division of application No. 11/517,655, filed on Sep. 8, 2006, now Pat. No. 8,055,526.

(51) Int. Cl.
*G06Q 10/00* (2012.01)
(52) U.S. Cl. .................. 705/7.21; 705/7.13; 705/7.14; 705/7.18
(58) Field of Classification Search ............. 705/7.13, 705/7.14, 7.18, 7.21
See application file for complete search history.

(56) References Cited

U.S. PATENT DOCUMENTS

| | | | |
|---|---|---|---|
| 1,867,602 A | 7/1932 | Stukenborg | |
| 2,600,876 A | 6/1952 | Jauch et al. | 222/23 |
| 2,769,575 A | 11/1956 | Harman et al. | 222/71 |
| 3,028,010 A | 4/1962 | Headrick | 210/172 |
| 3,323,534 A | 6/1967 | Johnson et al. | 137/101.21 |
| 3,535,683 A | 10/1970 | Woods et al. | 340/172.5 |
| 3,559,188 A | 1/1971 | Proctor | 340/172.5 |
| 4,101,100 A | 7/1978 | Smith et al. | 244/114 R |
| 4,186,381 A | 1/1980 | Fleischer et al. | 340/152 R |
| 4,269,240 A | 5/1981 | Cutore | 141/392 |
| 4,313,168 A | 1/1982 | Stephens et al. | 364/465 |
| 4,408,204 A | 10/1983 | Salvesen | 340/870.24 |
| 4,575,803 A | 3/1986 | Moore | 364/551 |
| 4,788,648 A | 11/1988 | Ferretti et al. | 702/55 |
| 4,819,183 A | 4/1989 | O'Brien et al. | 700/282 |
| 4,839,854 A | 6/1989 | Sakami et al. | 364/900 |
| 4,850,223 A | 7/1989 | Carlin et al. | 73/49.2 |
| 5,051,920 A | 9/1991 | Reams et al. | 364/509 |
| 5,056,017 A | 10/1991 | McGarvey | 705/28 |
| 5,065,013 A | 11/1991 | Taylor | 250/231.18 |

(Continued)

FOREIGN PATENT DOCUMENTS
CH    636566    6/1983
(Continued)

OTHER PUBLICATIONS

Authorized Federal Supply Service Information Technology Schedule Pricelist, General Purpose Commercial Information Technology Equipment, Software and Services, Contract No. GS-35F-0549L, Period Covered by Contract: Aug. 16, 2001-Aug. 15, 2016, gsaadvantage.gov, last updated Aug. 4, 2011.*

(Continued)

*Primary Examiner* — Justin M Pats
(74) *Attorney, Agent, or Firm* — King & Spalding LLP

(57) ABSTRACT

An intelligent solution for monitoring, assigning, and accounting fueling operations. An automated dispatch fueling system comprises a fuel management server populated with airport profile and dispatcher configurations. Utilizing information stored in the database and received from external systems, the automated dispatch fueling system can automatically assign and monitor fueling operations.

10 Claims, 6 Drawing Sheets

U.S. PATENT DOCUMENTS

| | | | |
|---|---|---|---|
| 5,103,225 A | 4/1992 | Dolan et al. .................... 341/13 |
| 5,156,198 A | 10/1992 | Hall ................................ 141/94 |
| 5,195,554 A | 3/1993 | Gaetano .................... 137/355.19 |
| 5,204,819 A | 4/1993 | Ryan .............................. 705/413 |
| 5,297,423 A | 3/1994 | Keating et al. ................. 73/49.2 |
| 5,318,254 A | 6/1994 | Shaw et al. .................... 244/134 |
| 5,400,253 A | 3/1995 | O'Connor ..................... 701/123 |
| 5,487,300 A | 1/1996 | Brackett et al. ............... 73/61.59 |
| 5,579,233 A | 11/1996 | Burns ............................ 700/240 |
| 5,595,244 A | 1/1997 | Roberts ......................... 166/178 |
| RE35,793 E | 5/1998 | Halpern ........................... 702/62 |
| 5,859,416 A | 1/1999 | Gatto ............................ 235/384 |
| 6,119,058 A | 9/2000 | Anderberg ...................... 701/29 |
| 6,370,488 B1 | 4/2002 | Beaudoin et al. .............. 702/188 |
| 6,370,515 B1 | 4/2002 | Diamond et al. ............... 705/28 |
| 6,463,389 B1 | 10/2002 | Dickson .......................... 702/35 |
| 6,481,627 B1 | 11/2002 | Guerreri .................. 235/427.01 |
| 6,505,106 B1 | 1/2003 | Lawrence et al. ............... 701/35 |
| 6,523,744 B2 | 2/2003 | Royal, Jr. et al. ............. 235/381 |
| 6,529,800 B1 | 3/2003 | Johnson et al. ............... 700/236 |
| 6,546,314 B1 | 4/2003 | Carr et al. ..................... 700/244 |
| 6,681,362 B1 | 1/2004 | Abbott et al. ................. 714/755 |
| 6,697,705 B2 | 2/2004 | Johnson et al. ............... 700/236 |
| 6,708,562 B2 | 3/2004 | Kruger et al. ................... 73/314 |
| 6,934,644 B2 | 8/2005 | Rogers et al. .................. 702/55 |
| 6,935,356 B2 | 8/2005 | Shepard et al. ..................... 137/1 |
| 6,975,964 B2 | 12/2005 | Reichler et al. ............... 702/182 |
| 7,082,406 B1 | 7/2006 | Dickson .......................... 705/24 |
| 7,107,231 B1 | 9/2006 | Hall et al. .................... 705/14.61 |
| 7,117,162 B1* | 10/2006 | Seal et al. ..................... 705/7.15 |
| 7,376,495 B2 | 5/2008 | Coggins et al. ..................... 701/3 |
| 7,693,621 B1 | 4/2010 | Chamas ......................... 701/16 |
| 2001/0034567 A1 | 10/2001 | Allen et al. .................... 700/283 |
| 2001/0051888 A1 | 12/2001 | Mayhak, Jr. et al. .............. 705/8 |
| 2002/0009993 A1 | 1/2002 | Dastrup et al. ................ 455/431 |
| 2002/0116299 A1 | 8/2002 | Diamond et al. ............... 705/28 |
| 2002/0128988 A1 | 9/2002 | Covington et al. ........... 705/413 |
| 2003/0065422 A1 | 4/2003 | Johnson et al. ............... 700/241 |
| 2003/0109973 A1 | 6/2003 | Hensey et al. .................. 701/35 |
| 2003/0191566 A1 | 10/2003 | Ben-Assa ....................... 701/29 |
| 2003/0195676 A1 | 10/2003 | Kelly et al. ..................... 701/29 |
| 2004/0039628 A1 | 2/2004 | Thompson et al. ............... 705/9 |
| 2004/0143476 A1* | 7/2004 | Kapadia et al. ................... 705/9 |
| 2004/0182966 A1* | 9/2004 | Schneider et al. ............. 244/13 |
| 2005/0090969 A1 | 4/2005 | Siok et al. ..................... 701/120 |
| 2005/0107897 A1 | 5/2005 | Callaghan ....................... 700/87 |
| 2005/0159878 A1* | 7/2005 | Coggins et al. ............... 701/123 |
| 2005/0216139 A1 | 9/2005 | Laughlin et al. .................. 701/3 |
| 2005/0246275 A1 | 11/2005 | Nelson ............................. 705/40 |
| 2005/0267673 A1* | 12/2005 | Blagg et al. ................... 701/123 |
| 2006/0046718 A1* | 3/2006 | Gevalt ........................ 455/432.3 |
| 2007/0265896 A1* | 11/2007 | Smith ................................ 705/7 |
| 2008/0065449 A1 | 3/2008 | Blagg et al. .................. 705/7.13 |
| 2008/0195442 A1 | 8/2008 | Blagg et al. ................... 701/123 |

FOREIGN PATENT DOCUMENTS

| | | |
|---|---|---|
| DE | 3743393 | 3/1989 |
| FR | 2623181 | 5/1989 |
| GB | 2 128 569 | 5/1984 |
| JP | 2168735 | 6/1990 |
| JP | 4253695 | 9/1992 |
| JP | 4327199 | 11/1992 |
| JP | 6156599 | 6/1994 |
| JP | 11073353 | 3/1999 |
| WO | WO 94/14652 | 7/1994 |

OTHER PUBLICATIONS

Thomet, The Aircraft Movement Simulation Model, Proceedings of the 1983 Winter Simulation Conference, IEEE 1983, p. 641-46, 48.*

FuelsManager Aviation Version 7.0 User Manual, p. 1-187, 2004.*

FuelsManager Aviation Version 7.0 Quick Start Guide, 2005, p. 1-16.*

FuelsManager Aviation Version 7.0 Brochure, 2005, p. 1-16.*

Langerman and Ehlers, Agent-Based Airline Scheduling, 1997, p. 1127-30.*

"Flow-Tran, The Complete Fuel Management System," 14 pp., Mar. 1991.

"Shell International Trading Company, London, Aviation Operations & Communications System, Statement of Requirements," Sponsored by: ITA, 39 pp., Nov. 27, 1990.

Feinman, George and Sonenshein, Bernard, "Automated Fueling for the Jet-Age Airport," *IEEE Transactions on Industry and General Applications*, vol. IGA-6, No. 6, Nov./Dec. 1970.

FuelsManager Aviation Version 7.0 User Manual, pp. 10187, 2004.

"FuelsManager Aviation Version 7.0 Quick Start Guide," pp. 1-16, 2005.

FuelsManager Aviation Version 7.0 Brochure, pp. 1-16, 2005.

Thomet, "The Aircraft Movement Simulation Model," *Proceedings of the 1983 Winter Simulation Conference, IEEE*, pp. 641-646, 48, 1983.

www.controlink.com, Explosion Proof Antenna Fitting Product Specification, Jan. 13, 2005, 4 pp.

PSM, "Tankview User's Guide," MAN019 Issue C, Jan. 2001, 16 pp.

* cited by examiner

SYSTEM AND METHOD FOR THE AUTOMATED DISPATCH OF FUELING OPERATIONS

RELATED APPLICATIONS

This application is a divisional of U.S. patent application Ser. No. 11/517,655 entitled "Method For the Automated Dispatch of Fueling Operations," filed Sep. 8, 2006 now U.S. Pat. No. 8,055,526. The present application is related to U.S. patent application Ser. No. 11/041,695, filed on Jan. 24, 2005; Ser. No. 11/039,050, filed on Jan. 20, 2005; Ser. No. 11/039,570, filed on Jan. 20, 2005; and 11/039,310, filed on Jan. 20, 2005. The complete disclosure of each of these related applications is hereby fully incorporated herein by reference.

FIELD OF THE INVENTION

The present invention relates to the automated creation and assignment of fueling operations. More particularly described, the present invention relates to automated fueling acquisition, delivery, and accounting for the aviation industry.

BACKGROUND OF THE INVENTION

The assignment, completion, and accounting of fueling operations for the aviation industry typically relies on a manually intensive paper-based system. Fueling resources, such as aircraft hydrant vehicles and fueling tanks, are typically affixed with mechanical meters. Utilizing these meters, a fueling agent (i.e., the person responsible for physically delivering fuel to an aircraft) records on a paper receipt the fueling resource's fuel totals before and after fueling an aircraft. Copies of this receipt are then hand carried to the pilot of the aircraft and to fuel accountants who manually calculate the total volume of fuel pumped into the aircraft. Eventually, fuel accountants manually key in the day's fuel information into an accounting database.

This conventional technology leads to numerous problems. The act of manually stamping paper tickets and passing hard copies to a number of different individuals is a time consuming and inefficient process. Further, lost tickets occur frequently in conventional paper-based systems, leading to lost inventory and inefficient record keeping.

Varec's® FuelsManager® Aviation 7.0 describes improvements to the conventional paper-based system described above. Specifically, among other things, the FuelsManager® Aviation 7.0 system supports electronic fuel ticketing, real-time dispatch operations, fuel accounting databases, and airline flight information systems in an integrated manner that eliminates paper-based transactions and accounting. Utilizing the FuelsManager® Aviation 7.0 system, a fueling operations dispatcher (hereinafter "dispatcher") can monitor aircraft fueling needs and assign fueling operations to available fueling agents. The fueling agents, in turn, can receive these requests from the dispatcher, gather the required fueling resources, and proceed to complete the assigned fueling operations (e.g., fuel the aircraft).

While the Fuelsmanager® Aviation 7.0 system provides significant improvements over conventional fueling transaction technologies, it requires the use of a human dispatcher to manually monitor a dispatch workstation and assign fueling operations as needs arise. Therefore, the efficiency and performance of the systems and methods is limited by the capabilities of the human dispatcher. Accordingly, there exists a need in the art for an advanced system for increasing the efficiency and cost-savings of monitoring and dispatching fueling requests in the aviation industry.

SUMMARY OF INVENTION

The inventive automated dispatch fueling system is capable of providing an intelligent, efficient, and cost-effective solution to the monitoring, assigning, and accounting of fueling operations. The automated dispatch fueling system may control and automatically assign fueling operations at one or multiple airports through the use of computer-based artificial intelligence. When utilized to control multiple airports, the automated dispatch fueling system may be located in a remote location or at one of the controlled airports.

The automated dispatch fueling system may comprise a fuel management server, a database, and dispatch client. A profile may be created for an airport including, but not limited to, a unique identifier (e.g., aircraft tail number) for each aircraft at the airport; a matrix designating the time it takes to move between gates and concourses at the airport; personnel (i.e., fueling agents) available to be assigned fueling operations at the airport, along with the fueling agents' work schedules and shifts; and a unique fueling equipment identifier for the available fueling equipment (e.g., fueling trucks and carts) available at the airport.

The automated dispatch fueling system may allow for the creation of fuel assignment "rules." These rules may include, but are not limited to, a rule specifying the minimum or maximum amount of time allowed for a fueling agent to move between fueling assignments; a rule limiting the number of back-to-back fueling operations automatically assigned to a fueling agent; a rule allowing or disallowing a fueling agent to move between certain gates and/or concourses; a rule allowing or disallowing the automatic assignment of fueling operations for international flights; and a rule specifying when an aircraft should be fueled (i.e., whether an aircraft should be fueled upon arrival or departure).

The automated dispatch fueling system is capable of using wireless (e.g., IEEE 802.11 or GPRS) or mobile communications to assign fueling operations to fueling agents. Similarly, a wireless or mobile communication technology may be utilized by the automated dispatch fueling system to communicate with external database systems. For example, the automated dispatch fueling system may be capable of storing information regarding the completed fueling operation.

For another aspect, the automated dispatch fueling system may be connected, via the Internet or other communication medium, to one or more external systems, such as an airline information systems, a fuel manager supervisory control and data acquisition (SCADA) system, and/or fuel accounting database. Thus, the automated dispatch fueling system may utilize real time flight information, verify fuel loads with airline weight and balance computers, and send completed electronic fueling tickets to aircraft messaging and customer billing systems.

By utilizing airport profiles, dispatcher selected rules, and information received from external sources, the automated dispatch fueling system is capable of automatically monitoring and assigning fueling operations without the assistance of a human operator. Further, in the event that unexpected problems arise, the automated dispatch fueling system may be capable of resolving the problem or, if necessary, the automated dispatch fueling system may visually or audibly notify a human dispatcher so that appropriate actions may be taken to solve the problem.

DETAILED DESCRIPTION OF THE EXEMPLARY EMBODIMENTS

The automated dispatch fueling system described herein may be utilized by the aviation industry to automatically monitor and assign fueling operations. The automated dispatch fueling system offers dramatic improvements over conventional technology, including the use of artificial intelligence to increase the efficiency of monitoring and assigning fueling operations and, thereby, reducing the costs associated with controlling aircraft fueling operations.

The automated dispatch fueling system may be utilized wherever a need arises for the efficient and cost-effective monitoring, assigning, and accounting of fueling operations for aircraft. While exemplary embodiments of the automated dispatch fueling system described herein are illustrated in relation to commercial airport settings, one of ordinary skill in the art understands that the automated dispatch fueling system and method can be used in an unlimited number of settings including, but not limited to, the government to effectively and efficiently fuel its aircrafts.

Figure 1:
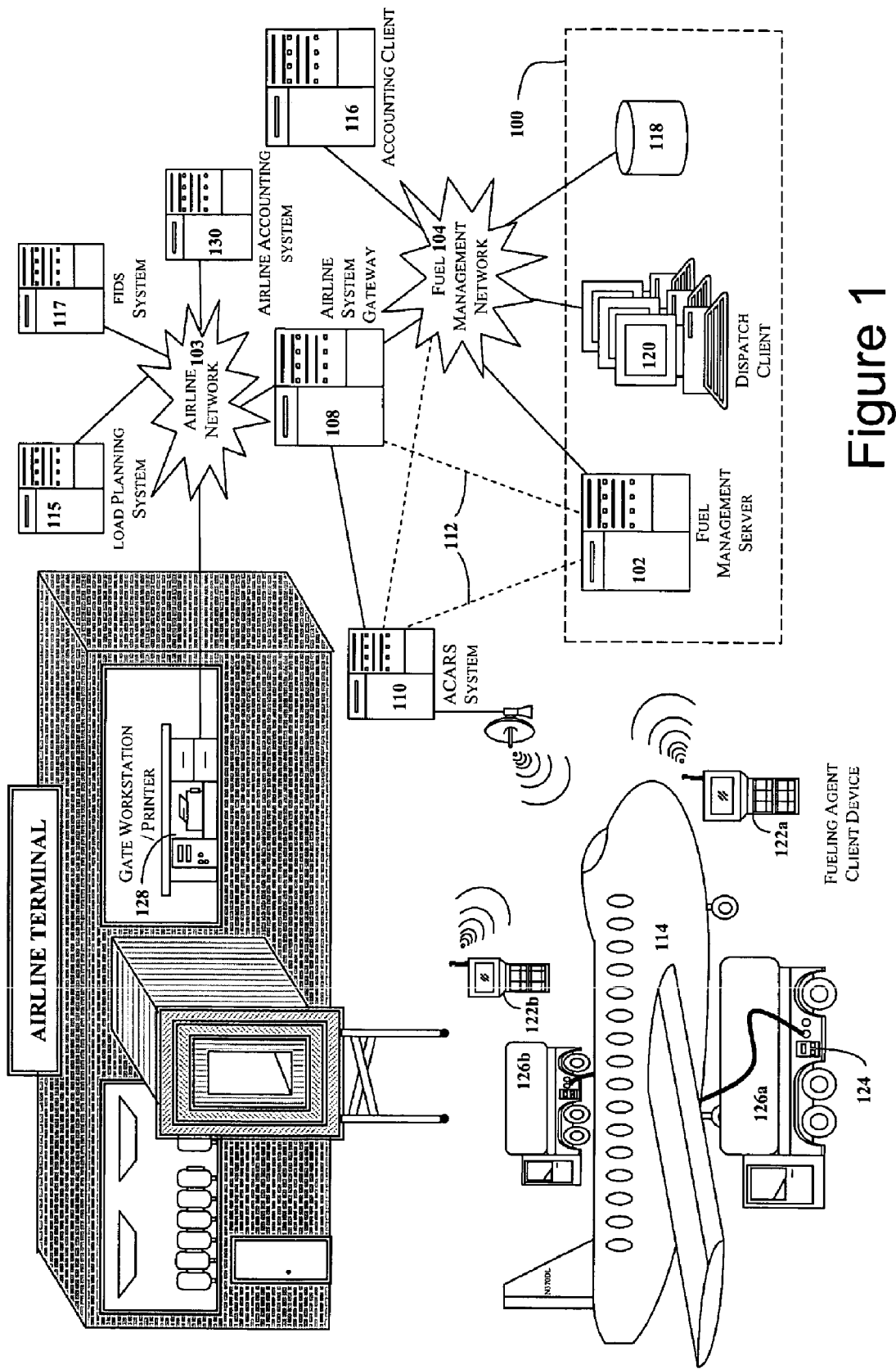
FIG. 1 illustrates the representative operating environment for an automated dispatch fueling system according to an exemplary embodiment.

Referring now to the attached figures, in which like numerals represent like elements, certain exemplary embodiments of the present invention will hereafter be described. FIG. 1 is a block diagram of a representative operating environment for an exemplary automated dispatch fueling system. As shown, the exemplary automated dispatch fueling system 100 comprises a fuel management server 102 and may include one or more dispatch clients 120 and a database 118. The fuel management server 102 performs the central management functions of the automated dispatch fueling system 100. The fuel management server 102 may comprise an operating system (e.g., Linux or Microsoft Windows) capable of running an executable software program. This executable software program may comprise software code capable of implementing the inventive processes described herein. One of ordinary skill in the art knows how to develop an executable software program to perform certain processes; therefore, functional processes are described herein in lieu of specific algorithms required to produce those processes. The fuel management server 102 may further comprise a user interface (i.e., graphical display) and input device (not illustrated). The fuel management server 102 may be coupled to the dispatch client 120 and, thereby, receive or display information to a dispatcher or other authorized user. The fuel management server 102 communicates via various communications links (which may be wired and/or wireless (e.g., IEEE 802.11 or GPRS)) with other components to collect and manage all system data and information, such as flight schedules, fuel planning information, reference data, aircraft configurations, transaction records and other accounting information. For example, the fuel management server 102 may communicate with various networked components via a communication medium, such as a wired and/or wireless network, referred to herein as the fuel management network 104.

In an exemplary embodiment, the automated dispatch fueling system 100 can communicate with fueling agents through wireless or mobile devices 122a-b, such as those described in U.S. patent application Ser. No. 11/039,050. The wireless or mobile devices 122a-b may be handheld units and may be able to receive, display, and transmit messages via an operating system, such as Windows CE or another portable operating platform. Examples of such systems are Varec's® Mobile Dispatch or Hydrant Cart Handheld System. As is understood by one of ordinary skill in the art, wireless or mobile communications may be encrypted in order to protect the information being communicated. In addition to wireless or mobile devices, other suitable communication mediums may likewise be utilized to communicate requests and information between the automated dispatch fueling system and fueling agents. For example, the automated dispatch fueling system 100 may communicate with a handheld device utilizing two way text messaging to assign fueling operations to fueling agents.

As illustrated in FIG. 1, the fuel management server 102 may communicate with an airline computer system, e.g., via an airline system gateway 108 connected to an airline network 103. The fuel management server 102 may communicate with the airline system gateway 108 and/or an Aircraft Communications Addressing and Reporting ("ACARS") system 110 via connections to the fuel management network 104 or via separate communication links 112. Via the airline system gateway 108, the fuel management server 102 receives aircraft fuel planning information from the airline's load planning system 115 and flight information from the airline's flight information display system (FIDS) 117. The flight information can be used to determine where and when fueling services are needed. Fuel planning information specifies the amount of fuel to be dispensed (i.e., required fuel load), the configuration of the aircraft's fuel tanks, and all other information required by a fueling agent to fuel an aircraft. The fuel management server 102 may actively request such information from the load planning system 115 and the FIDS 117, or may passively receive the information. The fuel management server 102 stores its own copy of the fuel planning information and flight information (e.g., in database 118). The fuel management server 102 periodically synchronizes its local copy of the fuel planning information and flight information with updated information from the airline computer system.

The ACARS system 110 is a well-known digital data link system for communicating information via VHF radio between ground-based transmitting/receiving stations and cockpit devices. By interfacing with the ACARS system 110, the fuel management server 102 can send electronic messages to and receive electronic messages from aircraft cockpit devices. In order to interface with the ACARS system 110, the fuel management server 102 may include appropriate encoders and/or decoders to translate or interpret electronic messages to/from the standardized ACARS messaging protocol. Alternatively, one or more other devices (separate from but in communication with the fuel management server 102) may provide the appropriate encoding/decoding functionality. In other embodiments, the ACARS system 110 may be replaced by another suitable data link system for communicating information between ground-based transmitting/receiving devices and cockpit devices.

The fuel management server 102 may automatically execute several services, including a dispatch server, an accounting server, and various administrative client programs. As illustrated in FIG. 1, an accounting client 116 and a dispatch client 120 may be provided for interaction with the accounting server and the dispatch server components, respectively, of the fuel management server 102. Any of the services provided by the fuel management server 102 may alternatively be provided by one or more separate network components. As illustrated, the database 118 may also be connected to the fuel management network 104 for storing fueling operation records and other system data.

In certain exemplary embodiments, a dispatcher accesses the fuel management server 102 by way of the dispatch client 120. Using the dispatch client 120, the dispatcher is able to access selected flight information and corresponding fuel planning information from the fuel management server 102 and use that information to create fueling operation records. Additionally, in certain exemplary embodiments, the dispatcher is able to manually control the automated dispatch fueling system 100 via the dispatch client 120.

At a busy airport, flight schedules, fueling assignments, etc. change often. Therefore, the fuel management server 102 stores (e.g., in the database 118) and manages the transaction records for all fueling operations. As stated above, the fuel management server 102 periodically receives updated flight information and fuel planning information from the airline computer system. Preferably, the fuel management server 102 automatically updates each fueling operation record with any appropriate updated flight information and/or fuel planning information. Once updated, the fuel management server 102 preferably automatically adjusts and reassigns fueling operations to fueling agents based upon the updated information.

Upon detecting a need for a fueling operation, the automated dispatch fueling system 100 determines how to respond to the request and transmits an assignment to a fueling agent client device 122. The fuel management server 102 may mark fueling operation records (e.g., stored in database 118) as having been dispatched to the assigned fueling agent client device 122. If the assigned fueling agent client device 122 fails or discards the transaction record before completing the fueling operation, the transaction record may be marked so that another fueling agent client device 122 may complete the fueling operation at a later time. Each fueling agent client device 122 periodically communicates with the fuel management server 102 to determine if the fueling operation record has been updated. If so, the fueling client device 122 receives a copy of the updated data and updates its local copy of the fueling operation record.

Dispatching a fueling operation record may involve making the transaction record available for delivery to the fueling agent client device 122 when the fueling agent client device 122 communicates with the fuel management server 102. In other embodiments, dispatching a fueling operation record may involve actively pushing the transaction record directly to a fueling agent client device 122 or to an account or mailbox to be accessed by the fueling agent client device 122. A fueling agent client device 122 may comprise any workstation or mobile computing devices. The use of mobile computing devices (e.g., handheld computers, laptop computer, fueling vehicle-mounted computer, etc.) as fueling agent client devices 122 provides greater mobility for the fueling agents, which can increase the efficiency of the aircraft fueling process.

The fueling agent may be required to input a user identification code and/or password in order to log-in to the fueling agent client device 122. Other security features and access restrictions may be implemented at the fueling agent client device 122 as well. Additional security for the fuel management system may be provided through the use of secured server networks and other firewall configurations. Authentication of the fueling agent's credentials may be performed at the fuel management server 102, locally at fueling agent client device 122, or at another suitable device. Once logged-in to the fueling agent client device 122, the fueling agent views the fueling operation record dispatched by the fuel management server 102.

In response to receiving the fueling operation record from the fuel management server 102, the software executed by the fueling agent client device 122 presents a sequence of display screens that guide the fueling agent through the aircraft fueling process. In general, the information presented by the graphical display of the fueling agent client device 122 prompts the fueling agent to enter the aircraft fuel gauge readings before and after the fueling. The aircraft fuel gauges provide the weight of the fuel in each tank of an aircraft. In certain embodiment, the pre-fueling aircraft gauge reading may be electronically transmitted to the fueling agent client device 122. For example, the fuel management server 102 may obtain the pre-fueling aircraft gauge reading directly or indirectly from the ACARS system 110 and may store the readings in the transaction record.

During the aircraft fueling process, the fueling agent is also prompted to enter the starting and ending meter values from the meter on the fueling vehicle 126. Optionally, the fueling agent client device 122 may be configured for communication with a data capture unit ("DCU") 124 that interfaces to the meter on the fueling vehicle 126. The DCU 124 electronically records the starting meter value before the fueling begins and the ending meter value when the fueling is completed. An exemplary DCU is commercially available from Varec, Inc. of Norcross, GA. The fueling agent client device 122 may communicate with a DCU 124 via a wireless or wired communication link. Again, a wireless link may be preferred because it provides greater mobility for the fueling agent, which can increases the efficiency of the aircraft fueling process.

The fueling agent client device 122 may prompt the fueling agent to input certain other information during the aircraft fueling process, for example for local or remote verification that the fueling agent is at the right gate, is fueling the correct aircraft, is dispensing the proper fuel, etc. In order to simplify the data input process, reference data may be stored on each fueling agent client device 122. Reference data may include aircraft information, gate numbers, vehicle identifications, product identifiers, ship numbers, IATA codes, etc. Relevant reference data may be displayed in the form of tables, menus and other selection lists in order to reduce the amount of typing required from the fueling agent. The fuel management server 102 stores and manages a master copy of all reference data. A system administrator or other authorized user may add, remove or edit the master copy of the reference data, which may be automatically synchronized with the local copy stored on each fueling agent client device 122.

During the fueling process, the fueling agent client device 122 may collect various status indicators. Status indicators may indicate, for example, that the fueling agent has accepted the fueling operation, the time that the fueling agent arrives at the aircraft to be fueled, the time that the fueling agent starts fueling the aircraft, the time that the fueling agent stops fueling the aircraft, and the time that the fueling agent departs the aircraft. These and other status indicators may be collected by way of prompting the fueling agent for user input, or may be collected automatically if the fueling agent client device 122 is equipped with hardware and/or software monitors for detecting the corresponding external events. The status indicators may be sent to the fuel management server 102 in real time as they are generated, or as part of a subsequent batch transmission or delivery. Status indicators may be displayed on the dispatch client 120 (or fuel management server 102) in order to keep the dispatcher apprised of the status the fueling operation.

When the fueling agent completes the physical fueling operation, the fueling agent client device 122 validates the final fuel load data by using a predefined and configured set of industry standard business rules. For example, a primary business rule may prevent the fueling agent from completing the fueling operation if the difference between the aircraft fuel tank gauge readings and the fuel pump meter readings exceeds a specified tolerance (as described in more detail below). Other business rules may optionally include: (i) ensuring that the final fuel load does not exceed the capacity for each fuel tank; (ii) ensuring that the difference between the percentage of filled capacity for the tanks on the left and right sides of the aircraft is less than a configured allowable value; (iii) ensuring that the percentage difference between the final fuel load and the required (requested) fuel load is less than a configured allowable value; and (iv) ensuring that the final fuel load is greater than or equal to the required (requested) fuel load. These and other business rules may be implemented by the fueling agent client device 122 to validate the final fuel load data. In some embodiments, the fueling agent client device 122 may generate audible or visual indicators (alarms, warning, etc.) or may generate output commands (e.g., to be sent to a DCU 124) for prohibiting or automatically terminating fueling if certain business rules are violated.

If the final fuel load data validation is unsuccessful, the fueling agent may need to make appropriate corrections (e.g., adjusting the aircraft fuel level, correcting or providing additional fuel meter readings or fuel tank gauge values data, etc.). When the final fuel load data validation is successful, the fueling agent client device 122 allows the fueling agent to complete the fueling process. The fueling agent client device 122 can transfer the final fuel load data to the fuel management server 102 via a wireless communication link (e.g., wireless connection to fuel management network 104) to be stored in the fueling operation record. Alternatively, the final fuel load data may be transferred from the fueling agent client device 122 to the fuel management server 102 by other means, such as via a hard-wired connection or by way of a portable memory storage device (e.g., a removable memory card).

The fuel management server 102 may optionally send final fuel load data to a weights and balances system for verification that the aircraft has been properly fueled. The weights and balances system may be integrated with the load planning system 115 of the airline network 103 or otherwise integrated with or connected to the fuel management server 102. If the weights and balances system indicates that the aircraft has not been properly fueled, the fuel management server 102 transmits an appropriate error message to the fueling agent client device 122. An error message may indicate, for example, that too much or too little fuel has been added to one or more of the aircraft fuel tanks As another example, the error message may prompt the fueling agent to re-check the aircraft gauges and/or fuel pump meters. Any other appropriate error message may similarly be transmitted by the fuel management server 102.

After receiving the final fuel load data (and optionally verifying the data with a weights and balances system) and storing it in the corresponding fueling operation record, the fuel management server 102 completes a search for available "adapters." Adapters are standard or custom software interfaces that communicate fuel ticket data to an airline's computer system and/or third-party applications and devices, such as printers, displays devices, etc. For example, an adapter can be implemented as a conventional printer driver for transmitting fuel ticket data to a printer for printing a paper ticket. Similarly, a conventional video interface can be used as an adapter for communicating fuel ticket data to video display for presentation in electronic format. In response to identifying an available adapter, the fuel management server 102 extracts the fuel ticket data from the transaction record and submits it to the adapter, which then routes the fuel ticket data through the appropriate interface to a printer, electronic display, computer system, or other device.

To facilitate delivery of fuel ticket data to the aircraft pilot, adapters can be provided for communicating fuel ticket data to a gate workstation and/or printer 128. Paper tickets can be printed in a standard format or a custom format specified by the airline. The paper ticket can be presented to the pilot before he or she boards the aircraft, or can be delivered to the cockpit by a gate agent. Alternatively (or additionally), an adapter may be provided for communicating fuel ticket information to a printer located at the fueling vehicle 126 or other location accessible to the fueling agent. As another alternative (or additional) option, an adapter may be provided for transferring fuel ticket data to the airline or third-party aviation computer system, which, in turn, routes the fuel ticket data to an appropriate printer for presentation at the aircraft to the pilot.

In certain embodiments, the fuel ticket data is electronically transmitted to the cockpit of the aircraft 114. For example, the fuel management server 102 may be configured to forward the fuel ticket data to an adapter that interfaces directly to an ACARS system 110, which encodes the fuel ticket data into an electronic message delivered to a cockpit computer. Alternatively, a custom adapter can be used to transfer the fuel ticket data to the airline computer system which, in turn, routes the fuel ticket data to the ACARS system 110. In still other alternative embodiments, the fueling agent client device 122 may be configured with a specific interface for sending the fuel ticket data to a printer, electronic display or computer inside the aircraft 114. By way of example, the fuel ticket data may be transmitted from the fueling agent client device 122 to the aircraft 114 via a wireless communication link. The fuel management server 102 may transmit fuel ticket data and other transaction data to an airline accounting system 130 and/or third-party accounting systems. For example, the fuel management server 102 may generate billing information for a fueling operation. To generate billing information the fuel management server 102 may accesses internal lookup tables using information such as fueling vehicle identification numbers, aircraft registration numbers and gates, the supplier, buyer, owner and vendor for the fuel. The fuel management server 102 may generate and/or collect other types of transaction data as well.

In an exemplary embodiment, the automated dispatch fueling system 100 may control the fueling operations at multiple airports (i.e., may operate in an enterprise setting), thereby avoiding costs associated with employing dispatchers at each airport. When utilized to control multiple airports, the automated dispatch fueling system 100 may be located at one of the airports under its control or remote from all of the controlled airports. In either scenario, however, the automated dispatch fueling system 100 is capable of utilizing redundant servers to ensure availability and to avoid loss of service.

Figure 2A:
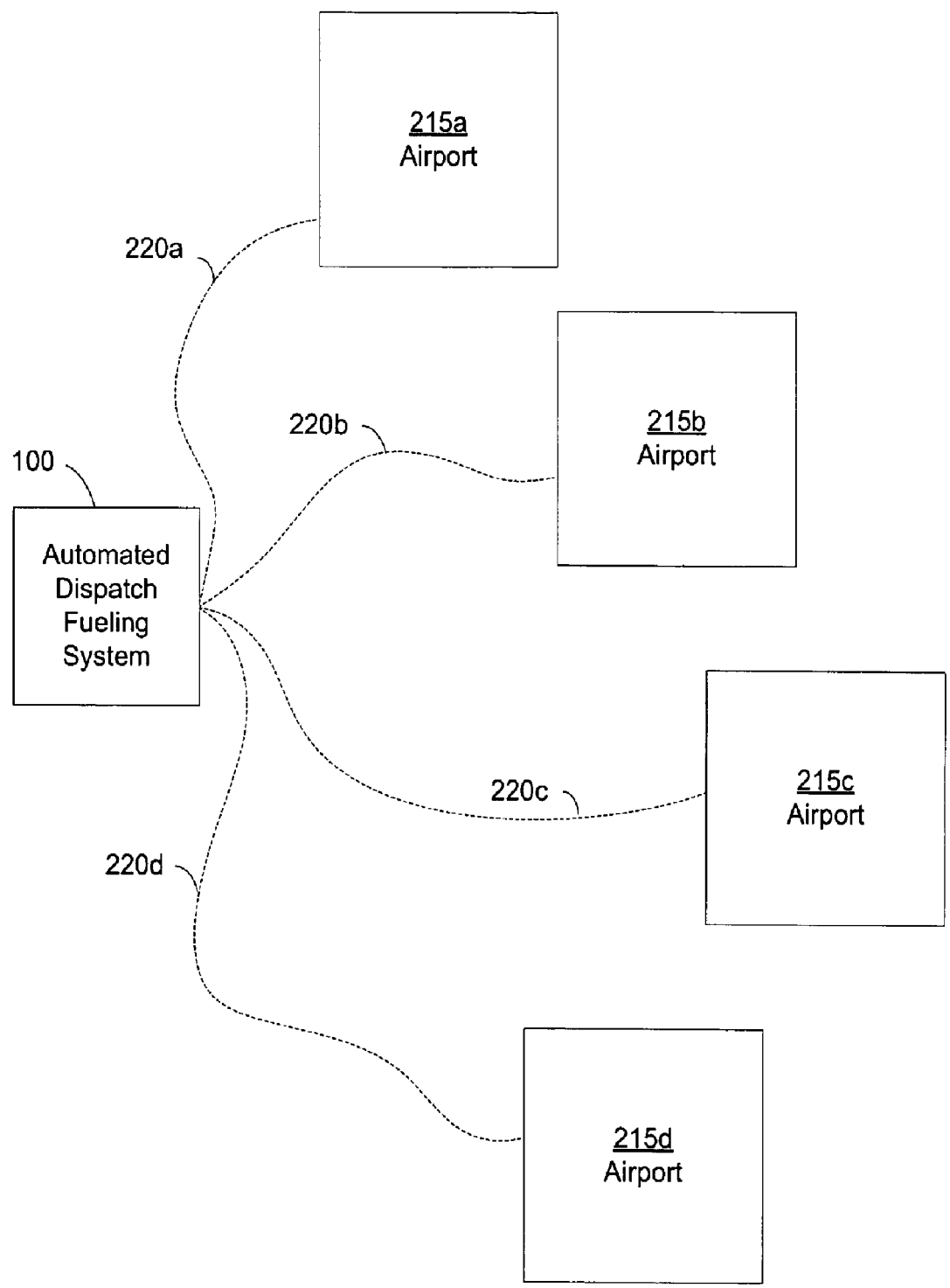
FIG. 2A illustrates a configuration of an automated dispatch fueling system according to an exemplary embodiment.
Figure 2B:
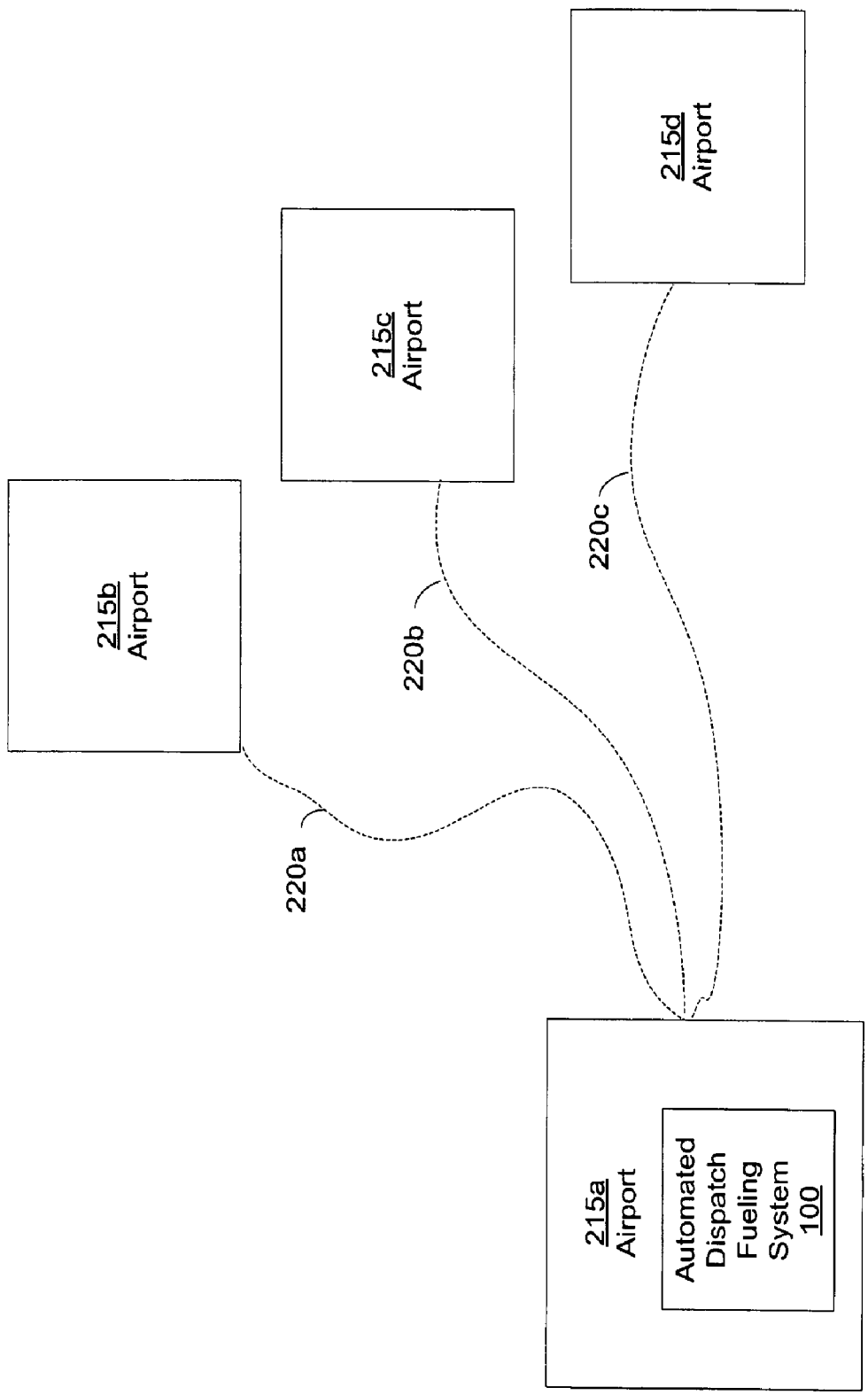
FIG. 2B illustrates a configuration of an automated dispatch fueling system according to another exemplary embodiment.

FIG. 2A illustrates an exemplary embodiments of the automated dispatch fueling system 100 located remote from multiple airports 215a-d. In this embodiment, the fuel automated dispatch fueling system, and, in particular, the fuel management server 102 (not illustrated in FIG. 2), communicates with the fueling agents at the multiple airports 215a-d over communication networks 220a-d. The communication networks 220a-d may utilize any number of communication mediums, including, but not limited to, Internet and wireless communication protocols. FIG. 2B illustrates an exemplary embodiment in which the automated dispatch fueling system 100 is located at one of the airports which it controls. This configuration may be preferred in situations where it is advantageous to have the fuel management server 102 and/or dispatch client 120 located at a large airport, but also utilized to control additional, smaller airports. Alternatively, the fuel management server 102 may be located at a central location such as a corporate office or third-party data center and utilized to control a combination of larger or smaller airports. In this configuration, the third-party data center may be owned and operated by a neutral or independent party. Also, a fee may be charged for services provided by the fuel management server 102. For example, a daily, monthly, or annual service fee may be charged for the automated dispatch of fueling operations controlled by the fuel management server 102. Alternatively or additionally, a flat fee for airports, or a graduated fee based on the amount of services utilized by a fueling company, may be charged. The fuel management server 102 may also be utilized to monitor and automatically assign fueling operations for multiple fueling companies when hosted by a third-party data center.

The automated dispatch fueling system 100, and, in particular, the fuel management sever 102, can communicate with fueling agents at the additional airports 215b-c over communication networks 220a-c. The automated dispatch fueling system 100 can support the ability to operate off-line and recover automatically due to intermittent communications. For instance, if the fuel management server 102 cannot communicate with a flight information display system 117, it can operate off-line and update its programming once communications are restored. In this situation, the automated dispatch fueling system 100 may notify the dispatcher (via a graphical display or through the dispatch client 120) that it has gone off-line so that the problem may be remedied. Likewise, if communication between the automated dispatch fueling system 100 and fueling agents is broken, the fuel management server 102 may notify the dispatcher so that other lines of communications may be opened.

The automated dispatch fueling system 100 can also support the ability to automatically track fueling resource inventories. In this way, the fuel management server 102 may notify the dispatcher (through a graphical display or dispatch client 120) if fueling resources become low. The fuel management server 102 can also monitor whether a particular fueling resource, airport code, aircraft, aircraft type, fueling equipment, or personnel is available. If not, the fuel management server 102 may disregard those devices until they are available again. Similarly, the fuel management server 102 can track whether a particular fueling agent is qualified to utilize certain fueling equipment or refuel certain aircraft. This way, the fuel management server 102 will not assign a fueling operation for which the fueling agent is unqualified to perform.

Further, the fuel management server 102 may designate overlapping fueling resources to fueling agents. In an exemplary embodiment, the fuel management server 102 can also support the configuration of the time to reload a fuel resource (e.g., tanker or fuel truck). For example, the fuel management server 102 can utilize data to determine how long a fuel resource takes to be loaded with fuel so that it can account for the time that will be necessary before that resource can be utilized for additional aircraft.

Utilizing the dispatch client 120 or graphical display of the fuel management server 102, a systems engineer or other authorized user (i.e., a person capable of setting up and configuring the system) may configure a profile for each airport that will be controlled by the automated dispatch fueling system 100. This profile may identify fueling agents, aircraft, gates, concourses, and fueling equipment for each airport. For example, a profile may be created for an airport including, but not limited to, a unique identifier (e.g., aircraft tail number) for each aircraft at the airport; a matrix designating the time it takes to move between gates and concourses at the airport; personnel (i.e., fueling agents) available to be assigned fueling operations at the airport, along with the fueling agents' work schedules and shifts; and a unique identifier for the available fueling equipment (e.g., fueling trucks and carts) available at the airport.

Once profiles have been recorded for each airport, the automated dispatch fueling system 100 may prompt the systems engineer or other authorized user to configure how the fuel management server 102 assigns fueling operations to available fueling agents. These "rules" may include, but are not limited to, a rule specifying the minimum or maximum amount of time allowed for a fueling agent to move between fueling assignments; a rule limiting the number of back-to-back fueling operations automatically assigned to a fueling agent; a rule allowing or disallowing a fueling agent to move between certain gates and/or concourses; a rule allowing or disallowing the automatic assignment of fueling operations for international flights; and a rule specifying when an aircraft should be fueled (i.e., aircraft should be fueled upon arrival or departure).

Figure 3:
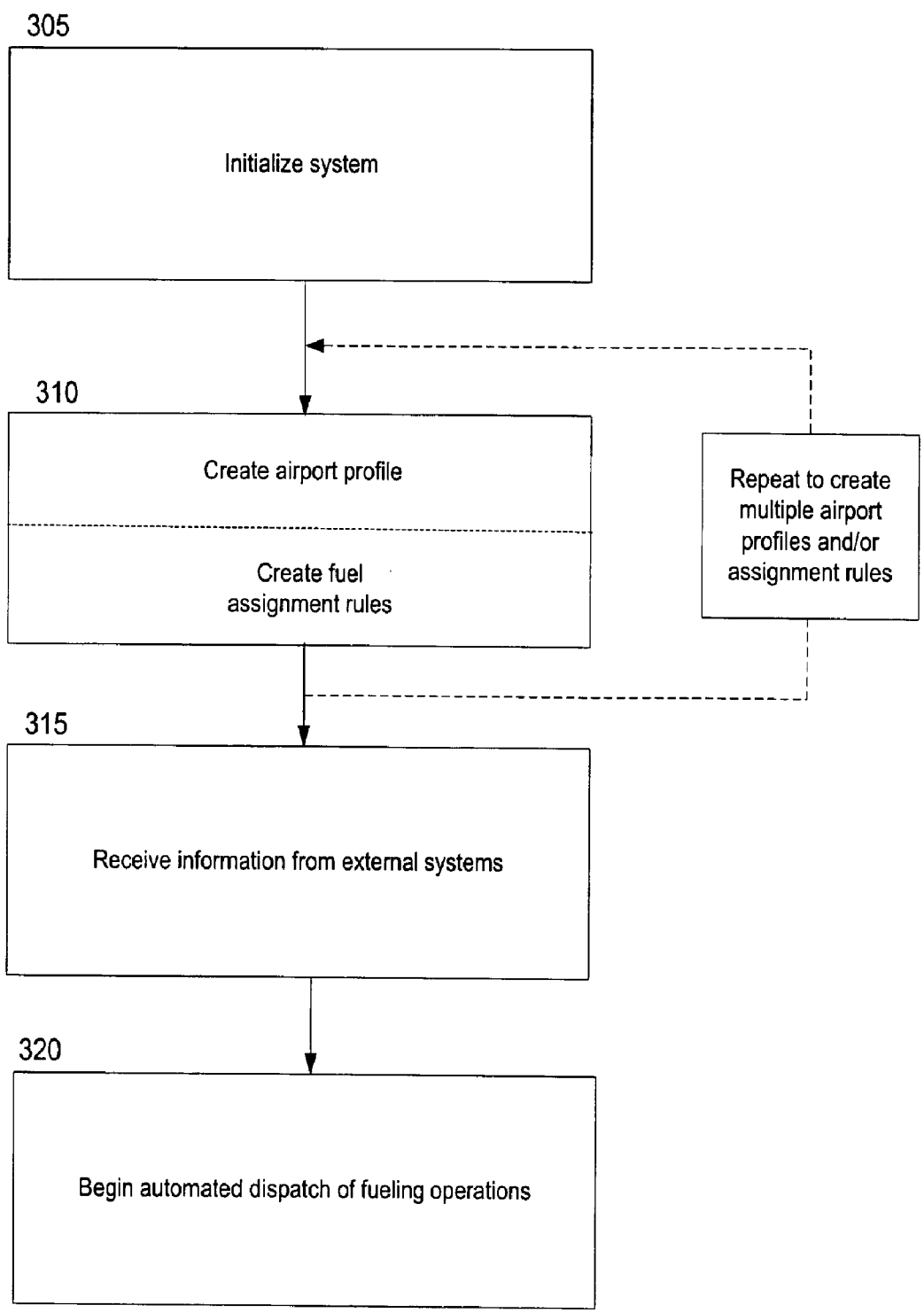
FIG. 3 is a flow chart illustrating a method for operating an automated dispatch fueling system according to an exemplary embodiment.

FIG. 3 illustrates a flow diagram for an exemplary process for operating an exemplary automated dispatch fueling system 100. Referring to FIGS. 1 and 3, at step 305, the system is initialized. This may be done by a systems engineer or other authorized user. At step 310, the system is configured by the systems engineer or other authorized user for assigning fueling operations. This involves setting the number of airports to be controlled by the system, configuring the airport profile(s), and establishing rules to be utilized by the system when automatically assigning fueling operations. At step 315, the automated dispatch fueling system 100 receives information from external systems, such as a load planning system 115, FIDS system 117, and airline accounting system 130. At this step, the fuel management server 102 may receive information from an external system, such as a FIDS system 117, indicating that a fueling operation is needed. Therefore, the fuel management server 102 utilizes this data, in combination with the airport profiles and rules established by the dispatcher or other authorized user, at step 320, to begin the process of automatically determining and assigning fueling operations to fueling agents. This process of FIG. 3 may optionally include the creation of flight lines to be assigned to fueling agents (as described below).

Figure 4:
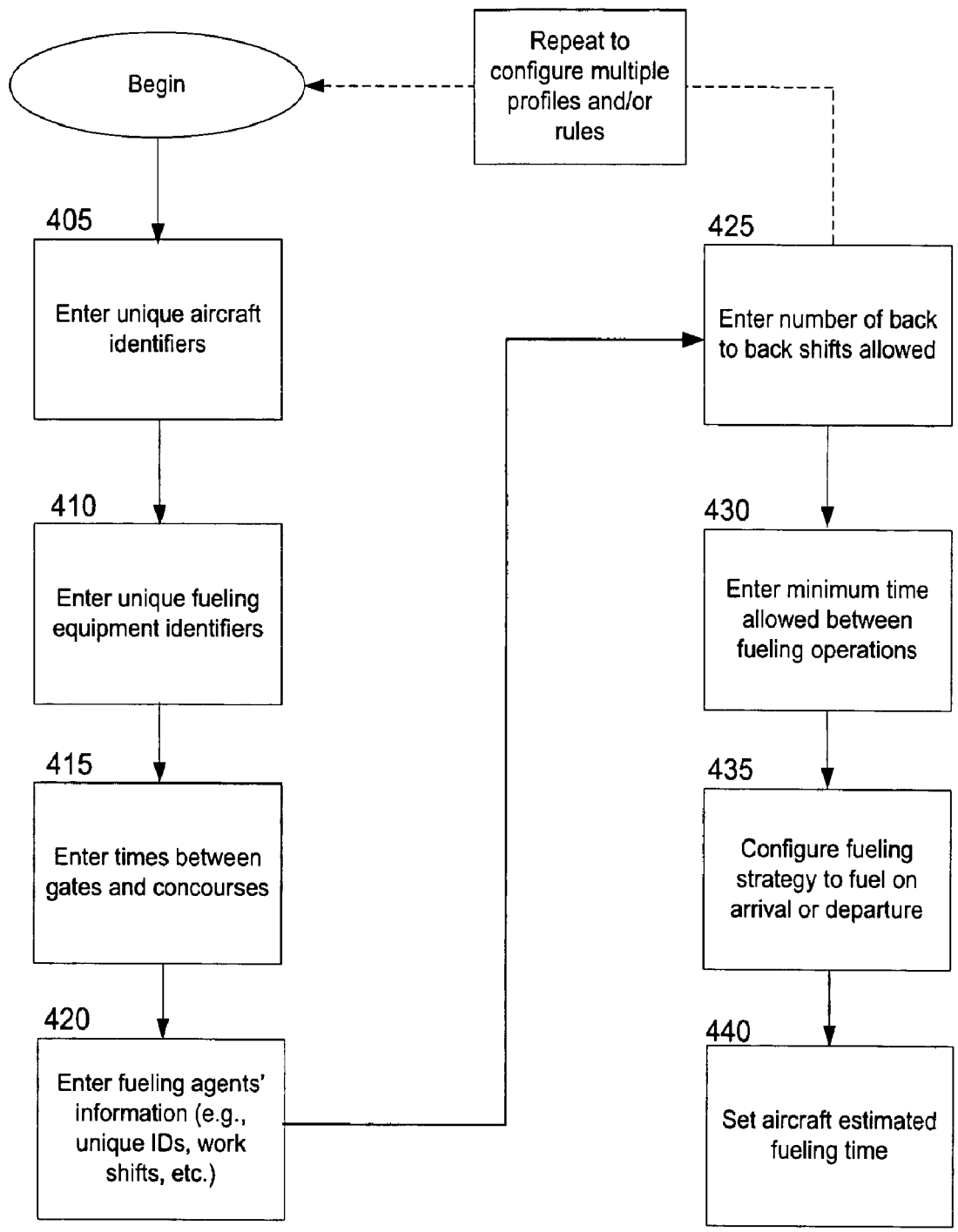
FIG. 4 is a flow chart illustrating a method for configuring the automated dispatch fueling system according to an exemplary embodiment.

FIG. 4 illustrates an exemplary method for setting profiles and configurations for an automated dispatch fueling system 100. If the system is utilized to control multiple airports, the steps will be repeated to create a profile and configuration for each airport controlled by the automated dispatch fueling system 100. Alternatively, multiple profiles may be created and a single set of "rules" may be established to govern the operations at all airports.

Referring now to FIG. 1 and FIG. 4, at step 405, a unique identifier is entered into the database for the aircraft that may require fueling operations at the airport. For example, the systems engineer or other authorized user may enter the aircraft tail number to identify each aircraft. At step 410, unique identifiers may be entered into the system to identify the fueling equipment (e.g., fueling trucks and carts) available at the airport. This way, the system may determine whether a particular piece of fueling equipment is out of service prior to utilizing it for a fueling operation. At step 415, a matrix detailing the time between gates and concourses for the airport can be mapped into the fuel management server 102. Specifically, the matrix associates each gate and concourse with an amount of time to reach a corresponding gate or concourse, thus allowing the automated dispatch fueling system 100 to consider how long it takes to move from one gate or concourse to another when assigning fueling operations.

At step 420, the identity of the fueling agents available at an airport will be stored into the database, along with the fueling agents' work schedules and shifts. Shifts could support information including, but not limited to, shift name, shift start time, shift end time, days shift is active, and an international flag (whether the personnel can be assigned fueling operations for international flights). Utilizing this information, the fuel management server 102 can determine which personnel are available to be assigned fueling operations. Additionally, the fuel management server 102 may use the shift information to warn a dispatcher if a situation develops where there are too few fueling agents to meet the required fueling operations. Thus, because it is necessary that the fuel management server 102 have an accurate account of available fueling agents, the automated dispatch fueling system 100 may be connected to an employee scheduling and timekeeper system or may be frequently updated (e.g., weekly or daily).

At step 425, once profiles have been recorded for each airport, the automated dispatch fueling system 100 may prompt the systems engineer or other authorized user to establish a rule setting a minimum amount of time allowed for a fueling operator to move between fueling tasks. In this way, the fuel management server 102 can allow a reasonable amount of time for assigning multiple fueling operations. At step 430, the systems engineer or other authorized user is prompted to establish a rule requiring fueling agents to have an extended break following multiple consecutive fueling operations. This may be required to satisfy work environment regulations, such as workplace regulations issued by OSHA. As part of this step, the automated dispatch fueling system 100 will require the systems engineer or other authorized user to enter the maximum amount of time between fueling operations that would make them consecutive fueling operations.

At step 435, the automated dispatch fueling system 100 prompts the systems engineer or other authorized user to enter the fueling strategy that should be employed at the airport or airports; that is, whether the aircraft should be fueled at arrival or on departure. At step 440, the automated dispatch fueling system 100 prompts the systems engineer or other authorized user to enter estimated fuel times for particular aircrafts. Utilizing this information, the fuel management server 102 can estimate how long it will take a fueling agent to complete a fueling assignment when faced with a particular aircraft and load level. In relation to these estimated fueling times, the fuel management server 102 may store historical records detailing the time required to fuel certain aircraft in order to estimate future fueling operations. Utilizing these historical trends, the fuel management server 102 may determine that a particular aircraft takes longer to fuel in certain situations, such as during the summer versus the winter, thereby, being able to more efficiently assign fueling operations in the winter and summer months. Thus, because of the computer-based artificial intelligence, the automated dispatch fueling system 100 has the capability to "learn" and better predict fueling times over a period of time.

Similarly, the automated dispatch fueling system 100 may also calculate estimated fueling times based upon the aircraft's range and type of aircraft. This may be done by calculating the time required for fueling an aircraft based upon the following formula: estimated fuel time=base fueling time+destination range adjustment value+aircraft type adjustment value. For example, the automated dispatch fueling system 100 may decrease fueling time if the flight is flagged as a regional flight or increase fueling time if the flight is flagged as an international flight (i.e., increase or decrease destination range adjustment value based upon the type of flight). The aircraft type adjustment may be a negative or positive number.

The automated dispatch fueling system 100 may also consider fueling parameters when calculating the estimated time to fuel an aircraft. These fueling parameters may include, but are not limited to, fuel mass, volume, density, and temperature when calculating estimated fueling times. Similarly, the automated dispatch fueling system 100 may consider external factors when forecasting the time that it will take to fuel an aircraft. These external factors may include, but are not limited to, type of fuel, type of refueling equipment, and aircraft maintenance status.

In another exemplary embodiment, the automated dispatch fueling system 100 may prompt the systems engineer or other authorized user to enter additional rules to configure how the automated dispatch fueling system 100 controls and assigns fueling operations. For example, the fuel management server may prompt the systems engineer or authorized user to select whether a fueling agent should be allowed to transfer from one concourse to another. Likewise. because international flights are less frequent, have varying flight schedules, and typically take longer to fuel (due to larger fuel capacities), the fuel management server may prompt the systems engineer or other authorized user to select whether the system should control the automated dispatch of fueling assignments for international flights. In accordance with this, the systems engineer or other authorized user may be prompted to enter the designation for each flight and aircraft, that is, whether a particular flight is commuter, domestic short, domestic medium, domestic long. international short, or international long. This information may also be included as part of the flight schedule that is automatically imported.

In an exemplary embodiment, the automated dispatch fueling system 100 has the capability to dynamically receive information from one or more external systems. In particular, the automated dispatch fueling system 100 may be capable of connecting, via the Internet or other communication medium, to an airline flight information system (e.g., FIDS system) and fuel load planning system. These high volume input and output systems can be supported without significantly degrading the performance of the automated dispatch fueling system 100.

Additionally, the automated dispatch fueling system 100 and method may also be connected to a fuel inventory management system, allowing the automated dispatch fueling system 100 to send and receive physical fuel inventories and automatically capture the density of the fuel. Likewise, the automated dispatch fueling system 100 can be connected to a fuel manager accounting client, whereby the automated dispatch fueling system 100 can automatically store completed fueling assignments and allow for an accurate and automated accounting of fueling resources and operations.

Utilizing information received from external sources (e.g., FIDS system), the automated dispatch fueling system 100 can alter fueling tasks as required to respond to changes including, but not limited to, a change in a code or flight status, a change in an aircraft's unique identification, a change in aircraft for a specific flight due to a mechanical failure (as signified by the aircraft's unique identifier), a change in an aircraft's estimated time of arrival (ETA), a change in an aircraft's estimated time of departures (ETD), cancellation of a flight, a change in an aircraft's arrival or departure gate, a change in an aircraft's destination, a change in a fueling agent's unique identification, a change in a flight's fuel load requirement, a change in a fueling resource, or a change in other factors (e.g., weather) that may affect the fueling operations.

Furthermore, in an exemplary embodiment, the automated dispatch fueling system 100, via the dispatch client or fuel management server, can visually indicate to a dispatcher that a change affecting a fueling operation has occurred. In this way, the dispatcher may take action, if necessary, to remedy the newly developed situation. Additionally, in the event that the fuel management server can automatically determine the proper corrective action, the dispatcher may be visually notified only after the corrective action has been taken by the fuel management server. As is understood by one of ordinary skill in the art, the actions that may be automatically taken by the system will vary based upon the specific configuration, rules, and profiles selected by the dispatcher. The automated dispatch fueling system 100 will typically make automatic corrective actions in situations where the problem can be solved through an automatic reassignment or cancelling of fueling operations.

In addition to a visual indicator, the automated dispatch fueling system 100 may also audibly alert the dispatcher of the occurrence of an event affecting a fueling operation. For example, the automated dispatch fueling system 100 may sound an audible alert upon receiving critical updates from a FIDS system. After sounding this alert, the inventive automated dispatch system can allow the dispatcher to view the details of the critical fuel request.

The automated dispatch fueling system 100 may allow for a systems engineer or other authorized user to manually store fueling assignments (i.e., flight lines). For instance, if a systems engineer or other authorized user would like to assign a particular group of flights to specific fueling agents, then the automated dispatch fueling system 100 would allow the systems engineer or other authorized user to establish a rule establishing a flight line for that particular fueling agent. This configuration would then become a rule that the automated dispatch fueling system 100 follows when controlling and assigning fueling operations.

The automated dispatch fueling system 100 likewise supports the ability to automatically create fueling lines based upon the airport profile, the system configuration (i.e., systems engineer or other authorized user preset rules), and information received from external sources. Flight lines allow for greater organization and efficiency by focusing fueling agents and resources. The automated dispatch fueling system 100 may create flight lines based upon fueling agent and resource availability, the time that it takes to move between gates, the number of back to back tickets allowed, whether a fueling agent can move between concourses, and whether international aircraft should be automatically controlled. If automatically created, the automated dispatch fueling system 100 will organize the flight lines such that a fueling agent is not assigned multiple fueling operations occurring at the same time.

More specifically, in one embodiment, the fuel management server may create flight lines as follows: (1) when the first fueling operation is assigned to a flight line, the scheduled start fuel time is moved to the estimated time of arrival for the aircraft; (2) when additional tickets are assigned to a flight line, the scheduled start fuel time is moved forward in time within the on-ground time available to the fueling agent. Further, additional fueling operations may be assigned to fueling agents based on system rules including, but not limited to, the least used resources, the estimated fuel times (not to overlap), tanker reload times, the movement time between gates, the time between tickets, the number of back to back tickets allowed, whether a fueling agent can move between concourses, and whether the automated dispatch fueling system 100 is set to control international flights.

Given the above (and assuming a setting whereby fueling agents cannot move between concourses and the maximum number of back to back tickets is three (3)) if the fuel management server receives a notification from an airline flight information system requiring the assignment of a new fueling operation, the fuel management server, in one embodiment, automatically performs the following: checks to see whether fueling agents are available at the required concourse, checks reload times for aircraft and fueling resources, and estimates times required for fueling to determine which fueling agents can accommodate the new fueling operation (without exceeding a maximum of three back-to-back tickets). After identifying a fueling agent that can accommodate the request, the automated dispatch fueling system 100 automatically assigns the new fueling operation to the identified fueling agent via, for example, the fueling agent client device. Further, in the event that the new fueling operation cannot be assigned (for whatever reason), the automated dispatch fueling system 100 can notify the dispatcher of the problem with a visual or audible alert.

Once a fueling operation is completed, the fuel management server can send data to a one or more external systems in order to properly document the fueling request. For example, the automated dispatch fueling system 100 may send information to be recorded by a fuel accounting client. Information that may be transmitted to a fuel accounting client may include, but is not limited to, the type of transaction, the transaction date, the flight number, the ticket number, the product used, the meter start (i.e., the meter reading before the transaction on a particular fueling resource), the meter stop (i.e., the meter reading after the transaction), the gross volume dispensed, the net volume dispensed, the product temperature, the product density, the product volume correction factor, the entity responsible for the physical inventory used in the current transaction, the entity responsible for the book inventory used in the current transaction, the entity responsible for the secondary storage equipment (e.g., the into-plane agent), the entity that consumed the product, the registration of the dispensing vehicle, the registration of the consuming aircraft, the gross inventory, the gross volume of the physical inventory, the net volume of the physical inventory, or the fueling agent responsible.

Figure 5:
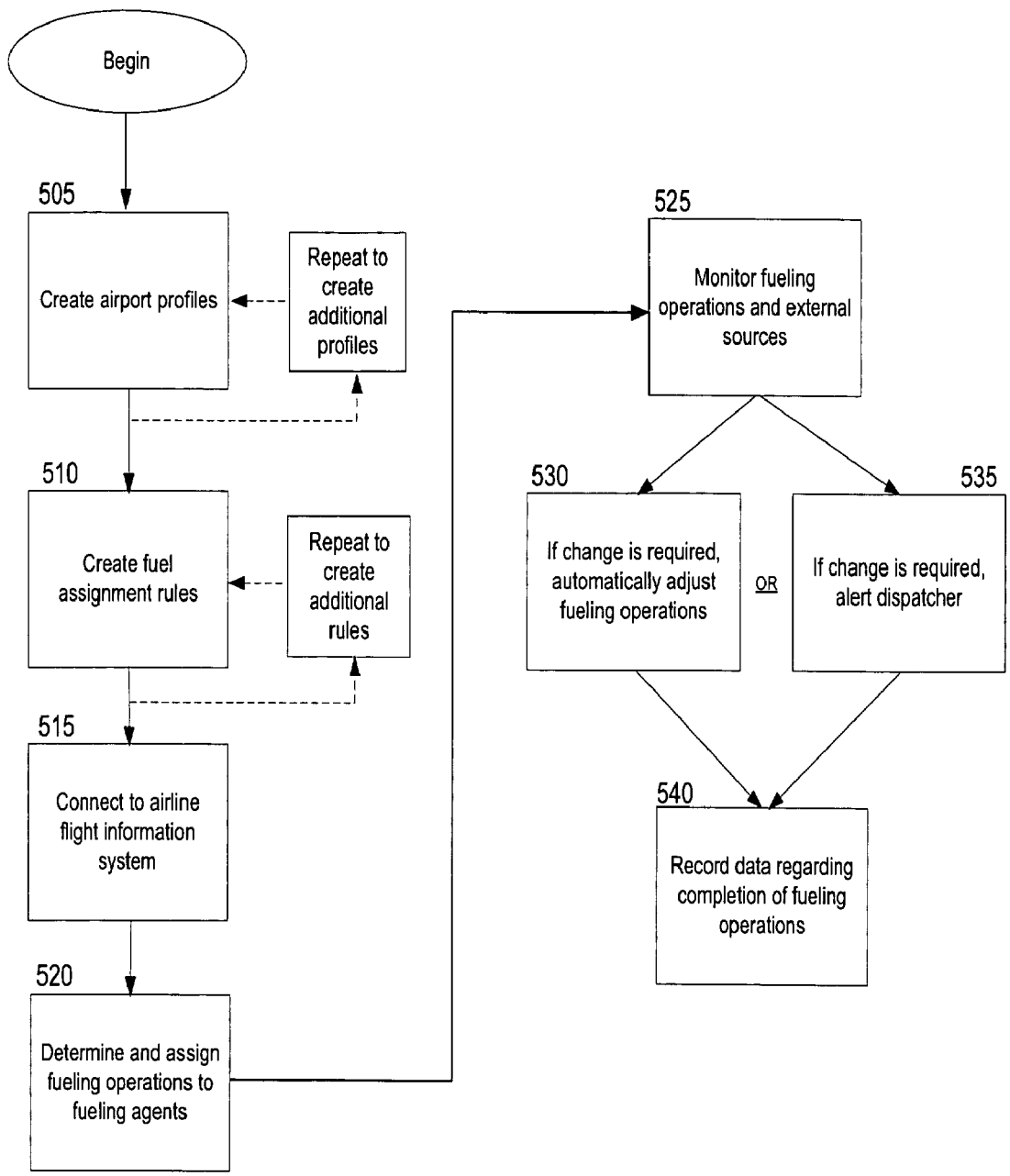
FIG. 5 is a flow chart illustrating a method for operating an automated dispatch fueling system according to an exemplary embodiment.

In conformance with the above described exemplary embodiments, FIG. 5 illustrates an exemplary method for operating the automated dispatch fueling system 100. At step 505, a systems engineer or authorized user is prompted by the automated dispatch fueling system 100 to enter one or more profiles of airports that will be controlled by the automated dispatch fueling system 100. At step 510, the systems engineer or authorized user configures the rules to be utilized by the automated dispatch fueling system 100 when assigning fueling operations. At step 515, the automated dispatch fueling system 100 connects, via the Internet or other communication means, to a flight information display system. At step 520, utilizing the information received from the flight information display system (e.g., aircraft ETA and ETD), the automated dispatch fueling system 100 determines and assigns a group of flight lines to available fueling agents. This determination by the automated dispatch fueling system 100 includes a consideration of the profiles and rule established by the systems engineer or authorized user, including, but not limited to, an aircraft's estimated fueling time.

At step 525, the automated dispatch fueling system 100 monitors the fueling operation assignments and records when they are completed. At step 530, if information is received by the automated dispatch fueling system 100, either from the fueling agent, an airline information display system, or another external source, that would require a fueling operation to be changed, the automated dispatch fueling system 100 attempts to compute a solution to the problem and take corrective actions (e.g., re-assign fueling operations). At this time, the automated dispatch fueling system 100 could also flag a fueling operation for follow-up if the problem is not urgent and cannot be resolved at that particular time. However, if a corrective measure cannot be determined by the system, at step 535, the automated dispatch fueling system 100 can notify the monitoring dispatcher through a visual or audible alert. In this way, the dispatcher can take manual measures to resolve the problem. For example, if a fueling agent becomes unavailable, the automated dispatch fueling system 100 may seek to re-assign the tasks to other available fueling agents; however, if the system is unable to accommodate the fueling operations given the available resources, it may notify the dispatcher so that additional fueling agents may be called in. Finally, at step 540, assuming the successful completion of the fueling operations, the automated dispatch fueling system 100 can send data regarding the completed fueling operation to an external system (e.g., fuel accounting system) for record keeping.

In other exemplary embodiments, the automated dispatch fueling system 100 can perform additional functions to increase the efficiency of fueling operations. For example, in one embodiment, the automated dispatch fueling system 100 may record and display a log of external interface messages that it has sent and received. The automated dispatch fueling system 100 may also support, receive, and predict the fuel loads through fuel load planning systems and can support the ability to fix fueling start times such that FIDS updates do not affect the start times. That is, even though real time data may be entered from the FIDS, the fuel times can be set to remain constant versus being altered through the FIDS data.

The automated dispatch fueling system 100 may also create new fueling operation assignments if a fueling operation for a flight does not exist. For example, the automated dispatch fueling system 100 could persist the following fuel load data: a message ID that is unique to the airline system; a date that the fuel load is to be boarded; a type of transaction, such as uplift or defuel; an outgoing flight number, i.e., a departure flight number; a date that the first leg of a flight began; a ship number for the aircraft, also called the registration number or tail number; an IATA code of the airport where the fueling is to take place, i.e., the station code; a final destination for the flight; an airline designation for the aircraft site; type of fuel aboard, such as JET-A or JET-A1, i.e., the product that would be loaded to that particular plane; the array of tank designators such as left/right and center, i.e., the tank location on the airplane; and the array containing the required fuel load specified as weights, as measured at a tank farm and entered into a load balancing system.

With the automated dispatch fueling system 100, the computerized artificial intelligence is capable of validating fuel loads with airline weight and balance systems before allowing the fueling agent to complete the fuel request and print or transmit the fueling ticket. Such a process could be performed by utilizing information including, but not limited to, a unique airline message ID; an outgoing flight number; a date the first leg of the flight began; an IATA code of the airport where the fueling took place; an array of tank designators and locations, such as left (L), right (R), and center (C); and an array containing the fuel weight as boarded on the plane (in respect to tank locations).

Accordingly, by utilizing airport profiles, configured rules, and information received from external systems, the automated dispatch fueling system 100 is capable of automatically monitoring and assigning fueling operations without the assistance of a human operator. Further, in the event that unexpected problems arise, the automated dispatch fueling system 100 may be capable of resolving the problem or, if necessary, the automated dispatch fueling system 100 may visually or audibly notify a human dispatcher or supervisor so that appropriate actions may be taken to solve the problem.

It should be understood that the foregoing relates only to illustrative embodiments of the invention, and that numerous changes may be made therein without departing from the scope and spirit of the invention as defined by the following claims. Additionally, the automated dispatch fueling system 100 may be utilized outside of the aviation industry wherever a need arises for the efficient and cost-effective monitoring, assigning, and accounting of fueling operations.

What is claimed is:

1. A system for the automated control of aviation fueling operations, comprising:
an automated dispatch fueling system, comprising:
a fuel management server configured to:
accept at least two airport profiles and three or more selectable configurations to be utilized for the automatic assignment of fueling operations, wherein the at least two airport profiles include individual aircraft identifiers for each aircraft utilizing the at least two airports, fueling equipment identifiers for each piece of fueling equipment available at each of the at least two airports, estimated time to travel between each airport gate to every other airport gate at the at least two airports, and each fueling agent's work schedule at the at least two airports, the three or more selectable configurations include designating:
a minimum amount of time allowed for a fueling agent to move between fueling assignments,
a maximum amount of time allowed for a fueling agent to move between fueling assignments,
an allowance of a fueling agent to move between certain gates,
an allowance of a fueling agent to move between certain concourses, and an allowance of a fueling agent to be assigned fueling operations for an international flight; and determine fueling operations assignments for the at least two airports based on the accepted (1) individual airport profiles and (2) three or more selectable configurations;

one or more communication mediums, coupled to the fuel management server, for communicating the fueling operations assignments to fueling agents, communicating information with an airline gateway system, an accounting client, and an Aircraft Communications Addressing and Reporting system, and receiving information regarding a status of the assigned fueling operations; and the fuel management server further configured to transmit, via at least one of the one or more communication mediums, the fueling operations assignments to one or more fueling agent client devices.

2. The system as recited in claim 1, further comprising a database, coupled to the fuel management server, for storing the at least two airport profiles and the three or more selectable configurations.

3. The system as recited in claim 1, wherein the automated dispatch fueling system further comprises a dispatch client for monitoring and controlling the assignment of fueling operations.

4. The system as recited in claim 1, further comprising the airline gateway system configured to communicate via the one or more communication mediums.

5. The system as recited in claim 1, further comprising the accounting client configured to communicate via the one or more communication mediums.

6. The system as recited in claim 1, further comprising the Aircraft Communications Addressing and Reporting system configured to communicate via the one or more communication mediums.

7. The system as recited in claim 1, further comprising the one or more fueling agent client devices configured to communicate via the one or more communication mediums.

8. The system as recited in claim 1, wherein the three or more selectable configurations further include designating a maximum number of consecutive fueling operations to be assigned to a fueling agent.

9. A method for the automated control of aviation fueling operations, comprising:

hosting a fuel management server at a third-party data center;

generating, by the fuel management server, individual airport profiles for at least two airports, wherein the individual airport profiles include individual aircraft identifiers for each aircraft utilizing the at least two airports, fueling equipment identifiers for each piece of fueling equipment available at each of the at least two airports, estimated time to travel between each airport gate to every other airport gate at each of the at least two airports, and work schedules for each fueling agent at each of the at least two airports;

accepting, by the fuel management server, three or more configurations associated with the individual airport profiles for at least two airports, wherein the three or more configurations include designating:

a minimum amount of time allowed for a fueling agent to move between fueling assignments, a maximum amount of time allowed for a fueling agent to move between fueling assignments, an allowance of a fueling agent to move between certain gates, an allowance of a fueling agent to move between certain concourses, and an allowance of a fueling agent to be assigned fueling operations for an international flight;

determining, by the fuel management server, fueling operations assignments for the at least two airports based on the accepted (1) individual airport profiles and (2) three or more selectable configurations;

transmitting, by the fuel management server, the fueling operations assignments to one or more fueling agent client devices;

communicating, via one or more communication mediums coupled to the fuel management server, with an airline gateway system, an accounting client, and an Aircraft Communications Addressing and Reporting system; and receiving, via the one or more communication mediums, information regarding a status of the assigned fueling operations.

10. The method as recited in claim 9, further comprising the step of charging a fee for the automated control of fueling operations.

* * * * *